United States Patent
Schwartzman et al.

(10) Patent No.: US 6,385,773 B1
(45) Date of Patent: *May 7, 2002

(54) METHOD AND APPARATUS FOR UPSTREAM FREQUENCY CHANNEL TRANSITION

(75) Inventors: Alejandro H. Schwartzman, San Jose; Mark E. Millet, Milpitas; Charles J. Naegeli, Montara; Wei-Sing Chen, Fremont; Hung-San Chen, San Jose, all of CA (US)

(73) Assignee: Cisco Techology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,060

(22) Filed: Jan. 7, 1999

(51) Int. Cl.[7] .............................................. H04N 7/173
(52) U.S. Cl. ...................................... 725/124; 725/125
(58) Field of Search ........................ 458/5.1, 4.2, 4.1; 348/6, 12, 10, 11; 370/248; 725/124, 125

(56) References Cited

U.S. PATENT DOCUMENTS

| | | | | |
|---|---|---|---|---|
| 5,586,121 A | * | 12/1996 | Moura et al. ................ | 370/404 |
| 5,862,451 A | * | 1/1999 | Grau et al. .................. | 455/5.1 |
| 5,930,231 A | * | 7/1999 | Miller et al. ................ | 370/210 |
| 5,943,604 A | * | 8/1999 | Chen et al. .................. | 455/5.1 |
| 5,991,271 A | * | 11/1999 | Jones et al. ................. | 370/252 |
| 6,052,819 A | * | 4/2000 | Barker et al. ............... | 714/476 |
| 6,091,432 A | * | 7/2000 | Langlais ..................... | 455/5.1 |

* cited by examiner

Primary Examiner—Victor R. Kostak
(74) Attorney, Agent, or Firm—Beyer Weaver & Thomas, LLP; Dean E. Wolf, Esq.

(57) ABSTRACT

Transitions among different upstream frequency channels in a cable television plant in order to transmit data occur while considering the noise level of the upstream frequency channel presently being used to transmit data. By taking into account the noise level of the presently used upstream frequency channel, the CMTS in a cable plant can make a more intelligent decision as to whether it is worthwhile changing the upstream frequency channel for a group of cable modems. A spectrum analyzer determines the noise level of a presently used frequency channel. A bit error rate for the present frequency channel is detected. The spectrum analyzer then determines whether the bit error rate exceeds a threshold value. Is so, it is then determined whether the noise level of the present frequency channel is greater than or less than the noise level of another frequency channel having the lowest noise level plus a buffer noise value. If the present noise level is greater, a transition is made to the other frequency channel with the lower noise level. If not, the cable plant continues using the present frequency channel. The noise level of the presently used frequency channel is measured at the CMTS upon receipt of an empty data packet arriving at a known timing mark.

66 Claims, 6 Drawing Sheets

METHOD AND APPARATUS FOR UPSTREAM FREQUENCY CHANNEL TRANSITION

CROSS-REFERENCES TO RELATED APPLICATIONS

This application is related to U.S. patent application Ser. No. 08/962,231, filed on Oct. 31, 1997, entitled Echo Device Method for Locating Upstream Ingress Noise Gaps at Cable Television Head Ends, commonly assigned, and incorporated by reference herein.

BACKGROUND OF THE INVENTION

1. Field of the Invention

The present invention relates generally to the field of transmitting digital data in cable television network systems using cable modems. More specifically, it relates to methods and apparatus for identifying efficient upstream channel transitions for reducing upstream frequency noise.

2. Discussion of Related Art

The cable TV industry has been upgrading its signal distribution and transmission infrastructure since the late 1980s. In many cable television markets, the infrastructure and topology of cable TV systems now include fiber optics as part of its signal transmission component. This has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cablecommuting.

Originally, cable TV lines were exclusively coaxial cable. The system included a cable headend, i.e. a distribution hub, which received analog signals for broadcast from various sources such as satellites, broadcast transmissions, or local TV studios. Coaxial cable from the headend was connected to multiple distribution nodes, each of which could supply many houses or subscribers. From the distribution nodes, trunk lines (linear sections of coaxial cable) extended toward remote sites on the cable network. A typical trunk line is about 10 kilometers long. Branching off of these trunk lines were distribution or feeder cables (40% of the system's cable footage) to specific neighborhoods, and drop cables (45% of the system's cable footage) to homes receiving cable television. Amplifiers are provided to maintain signal strength at various locations along the trunk line. For example, broadband amplifiers are required about every 2000 feet depending on the bandwidth of the system. The maximum number of amplifiers that can be placed in a run or cascade is limited by the build-up of noise and distortion. This configuration, known as tree and branch, is still present in older segments of the cable TV market.

With cable television, a TV analog signal received at the headend of a particular cable system is broadcast to all subscribers on that cable system. The subscriber simply needed a television with an appropriate cable receptor to receive the cable television signal. The cable TV signal was broadcast at a radio frequency range of about 50 to 800 MHz. Broadcast signals were sent downstream; that is, from the headend of the cable system across the distribution nodes, over the trunk line, to feeder lines that led to the subscribers. However, the cable system did not have installed the equipment necessary for sending signals from subscribers to the headend, known as return or upstream signal transmission. Not surprisingly, nor were there provisions for digital signal transmission either downstream or upstream.

In the 1980s, cable companies began installing optical fibers between the headend of the cable system and distribution nodes (discussed in greater detail with respect to FIG. 1 below). The optical fibers reduced noise, improved speed and bandwidth, and reduced the need for amplification of signals along the cable lines. In many locations, cable companies installed optical fibers for both downstream and upstream signals. The resulting systems are known as hybrid fiber-coaxial (HFC) systems. Upstream signal transmission was made possible through the use of duplex or two-way filters. These filters allow signals of certain frequencies to go in one direction and of other frequencies to go in the opposite direction. This new upstream data transmission capability allowed cable companies to use set-top cable boxes and allowed subscribers pay-per-view functionality, i.e. a service allowing subscribers to send a signal to the cable system indicating that they want to see a certain program.

In addition, cable companies began installing fiber optic lines into the trunk lines of the cable system in the late 1980s. A typical fiber optic trunk line can be up to 80 kilometers long, whereas a typical coaxial trunk line is about 10 kilometers long, as mentioned above. Prior to the 1990s, cable television systems were not intended to be general-purpose communications mechanisms. Their primary purpose was transmitting a variety of television signals to subscribers. Thus, there needed to be one-way transmission paths from a central location, known as the headend, to each subscriber's home, delivering essentially the same signals to each subscriber. HFC systems run fiber deep into the cable TV network offering subscribers more neighborhood specific programming by segmenting an existing system into individual serving areas between 100 to 2,000 subscribers. Although networks exclusively using fiber optics would be optimal, presently cable networks equipped with HFC configurations are capable of delivering a variety of high bandwidth, interactive services to homes for significantly lower costs than networks using only fiber optic cables.

FIG. 1 is a block diagram of a two-way HFC cable system utilizing a cable modem for data transmission. It shows a headend 102 (essentially a distribution hub) which can typically service about 40,000 subscribers. Headend 102 contains a cable modem termination system (CMTS) 104 that is needed when transmitting and receiving data using cable modems. Headend 102 is connected through pairs of fiber optic lines 106 (one line for each direction) to a series of fiber nodes 108.

Each headend can support normally up to 80 fiber nodes. Pre-HFC cable systems used coaxial cables and conventional distribution nodes. Since a single coaxial cable was capable of transmitting data in both directions, one coaxial cable ran between the headend and each distribution node. In addition, because cable modems were not used, the headend of pre-HFC cable systems did not contain a CMTS. Each of the fiber nodes 108 is connected by a coaxial cable 110 to duplex filters 112 which permit certain frequencies to go in one direction and other frequencies to go in the opposite direction (frequency ranges for upstream and downstream paths are discussed below). Each fiber node 108 can normally service up to 500 subscribers, depending on the bandwidth. Fiber node 108, coaxial cable 110, two-way amplifiers 112, plus distribution amplifiers 114 along trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

Recently, it has been contemplated that HFC cable systems could be used for two-way transmission of digital data. The data may be Internet data, digital audio data, or digital video data, in MPEG format, for example, from one or more external sources 100. Using two-way HFC cable systems for transmitting digital data is attractive for a number of reasons. Most notably, they provide up to a thousand times faster transmission of digital data than is presently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data is typically transmitted at speeds ranging from 2,400 to 56,600 bits per second (bps) using commercial (and widely used) data modems for personal computers. Using a two-way HFC system as shown in FIG. 1 with cable modems, data may be transferred at speeds of 10 million bps, or more. Table 1 is a comparison of transmission times for transmitting a 500 kilobyte image over the Internet.

TABLE 1

Time to Transmit a Single 500 Kbyte Image

| | |
|---|---|
| Telephone Modem (28.8 kbps) | 6–8 minutes |
| ISDN Line (64 kbps) | 1–1.5 minutes |
| Cable Modem (10 Mbps) | 1 second or less |

Furthermore, subscribers can be fully connected twenty-four hours a day to services without interfering with cable television service or phone service. The cable modem, an improvement of a conventional PC data modem, provides this high speed connectivity and is, therefore, instrumental in transforming the cable TV system into a full service provider of video, voice and data telecommunications services.

As mentioned above, the cable TV industry has been upgrading its coaxial cable systems to HFC systems that utilize fiber optics t o connect headends to fiber nodes and, in some instances, using them in the trunk lines of the coaxial distribution system. In way of background, optical fiber is constructed from thin strands of glass that carry signals longer distances and have a wider bandwidth than either coaxial cable or the twisted pair copper wire used by telephone companies. Fiber optic lines allow signals to be carried much greater distances without the use of amplifiers (item 114 of FIG. 1). Amplifiers degrade the signal quality and are susceptible to high maintenance costs. Thus, coaxial distribution systems that use fiber optics have much less need for amplifiers. In addition, amplifiers are typically not needed for fiber optic lines (item 106 of FIG. 1) connecting the headend to the fiber nodes.

In cable systems, digital data is carried over radio frequency (RF) carrier signals. Cable modems are devices that convert a modulated RF signal to digital data and converts the digital data back to a modulated RF signal. The conversion is done at two points: at the subscriber's home by a cable modem and at a CMTS located at the headend. The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data is fed to the cable modem which converts it to a modulated RF signal. Once the CMTS receives the RF signal, it demodulates it and transmits the digital data to an external source.

As mentioned above, cable modem technology is in a unique position to meet the demands of users seeking fast access to information services, the Internet and business applications, and can be used by those interested in cable commuting. Not surprisingly, with the growing interest in receiving data over cable network systems, there has been increased focus on performance, reliability, and improved maintenance of such systems. In sum, cable companies are in the midst of a transition from their traditional core business of entertainment video programming to a position as full service providers of video, voice and data telecommunication services. Among the elements that have made this transition possible are technologies such as the cable modem.

A problem common to all upstream data transmission on cable systems, i.e. transmissions from the cable modem in the home back to the headend, is ingress noise which lowers the signal-to-noise ratio, also referred to as carrier-to-noise ratio, of an upstream channel. Ingress noise can result from numerous internal and external sources. Sources of noise internal to the cable system may include cable television network equipment, subscriber terminals (televisions, VCRs, cable modems, etc.), intermodular signals resulting from corroded cable termini, and core connections. Significant sources of noise external to the cable system include home appliances, welding machines, automobile ignition systems, and radio broadcasts, e.g. citizen band and ham radio transmissions. All of these ingress noise sources enter the cable system over the coaxial cable line, which acts essentially as a long antenna. Ultimately, when cable systems are entirely optical fiber, ingress noise will be a far less significant problem. However, until that time, ingress noise is and will continue to be a problem with upstream transmissions.

The portion of bandwidth reserved for upstream signals is normally in the 5 to 42 MHz range. Some of this frequency band may be allocated for set-top boxes, pay-per-view, and other services provided over the cable system. Thus, a cable modem may only be entitled to some fraction or "sub-band" such as between 200 KHz to 3.2 MHz. This sub-band is referred to as its "alloted band slice" of the entire upstream frequency range (5 to 42 MHz). This portion of the spectrum—from 5 to 42 MHz—is particularly subject to ingress noise and other types of interference. Thus, cable systems offering two-way data services must be designed to operate given these conditions.

As noted above, ingress noise, typically narrow band, is a general noise pattern found in cable systems. Upstream channel noise resulting from ingress noise adversely impacts upstream data transmission by reducing data throughput and interrupting service, thereby adversely affecting performance and efficient maintenance.

When a particular contiguous group of sub-bands or alloted band slices, referred to as an upstream frequency channel or frequency channel, reaches an unacceptable signal to noise ratio, the CMTS begins searching for a cleaner, unused frequency channel for the upstream signal. A frequency channel is used by a group of cable modems (the grouping typically based on physical location) to transmit signals upstream to the headend. A spectrum analyzer located in the headend (discussed in FIG. 2) identifies another upstream frequency channel that has a low power level which indicates that there is little noise on that upstream frequency channel. If a frequency channel has a high power measurement, the channel is very likely already being used by another upstream frequency channel. Conversely, if the spectrum analyzer expects a particular frequency channel to not be transmitting a signal, any power measurement for that frequency channel is a measurement of noise in that frequency channel. Cable modems in the cable plant can be divided into groups (or subscriber areas) in which cable modems in each group share the same upstream frequency channel. This is possible by using, for example, time division multiplexing, a technique known in the art in which each cable modem transmits at a particular time when no other cable modem is allowed to transmit signals.

Using a Fast Fourier Transform (FFT), the spectrum analyzer can measure power levels of the upstream channel and identify an upstream frequency channel that has a low noise level, i.e. a clean frequency channel. Frequency channels having a low power measurement are very likely not being used to transmit a signal, i.e. data, (otherwise they would have a significantly higher power measurement). Thus, any power measurement in those channels is an indication of noise in those channels. The spectrum analyzer can then instruct the headend to change the upstream frequency channel for a group of cable modems to the frequency channel having a lower noise level. However, this transition to another upstream frequency channel may not result in any significant improvement or any improvement at all. If there is a major source of noise in the external or internal environments to the cable plant spanning a wide frequency spectrum, the headend can continually switch upstream frequency channels and still not result in any significant improvement in signal to noise ratio. In this situation and in other less extreme situations it may be better to continue using the currently used frequency channel even if its noise level is above a certain threshold level.

The overhead in traffic on the cable plant resulting from the CMTS having to inform each cable modem to change frequencies can be high. For example, the CMTS must send information to each cable modem indicating on which upstream frequency to send information. This starts an initialization process thereby causing delays in data communications. It is better to avoid using the fiber and coaxial lines for signalling frequency changes and indicating telemetry status of the cable modems. With current systems and techniques, the spectrum analyzer does not measure the noise level of the presently used upstream frequency channel to determine whether transitioning to another frequency is worth the processing overhead. With current systems, the spectrum analyzer simply determines that another frequency channel may have a slightly lower noise level and will instruct the CMTS to switch to another upstream frequency.

Therefore, it would be desirable to be able to measure the noise level of the upstream frequency channel currently in use by one or more cable modems in the cable plant before switching to another frequency channel. This noise-level data can be used to make a more intelligent decision as to whether to transition to another upstream frequency channel or remain on the one currently in use, thereby reducing unnecessary signalling traffic and processing in the headend and at the cable modem.

SUMMARY OF THE INVENTION

To achieve the foregoing, and in accordance with the purpose of the present invention, methods and systems for changing upstream frequency channels when the frequency channel presently in use has too high a noise level and, in the process, avoid making frequency channel changes that will not result in a significant improvement are disclosed. In one aspect of the present invention, a method of transitioning from a current frequency channel to another frequency channel in a cable plant is described. A spectrum analyzer examines the power level of the current frequency channel. A bit error rate for the current frequency channel is detected for the frequency channel, having a noise level, by an upstream receiver. The spectrum analyzer then determines whether the bit error rate exceeds a threshold value. If so, the spectrum analyzer then determines whether another frequency channel has a noise level less than the noise level of the current frequency channel by at least a threshold amount. If another frequency channel has such a noise level, the headend changes upstream frequency channels from the current frequency channel to the other frequency channel having the lower noise level.

In another embodiment of the present invention, the noise level of the present frequency channel is measured while the frequency channel is being used to transmit data upstream. The spectrum analyzer can measure the noise level of the current frequency channel and use this data to decide whether to transition to another frequency channel. By comparing the noise level of the presently used frequency channel to other potentially better frequency channels, a spectrum analyzer can make a more informed decision as to whether to transition to another frequency channel. In another embodiment, the spectrum analyzer accumulates noise-level data relating to the present frequency channel at predetermined time intervals, such as during timing marks in which the spectrum analyzer receives an empty data packet sent from an appropriately instructed cable modem. In yet another embodiment, it is determined whether the noise level of the present frequency channel is greater than the noise level of other frequency channels by at least a threshold amount in order to justify transitioning to another frequency channel.

In another aspect of the present invention, a method for measuring noise levels in an upstream frequency channel while the upstream frequency channel is being used to transmit data upstream is described. An upstream frequency channel to be monitored is chosen from among multiple upstream frequency channels in the upstream band. A cable modem using the chosen upstream frequency channel is assigned a timing mark by the headend in which the cable modem can send data upstream to the CMTS. The cable modem is instructed to send an empty data packet to the headend on the chosen upstream frequency channel at the timing mark. Once the empty data packet is received, the noise level of the frequency channel can be measured using the empty data packet.

In another aspect of the present invention, an apparatus in a cable television plant for deciding when to transition between upstream frequency channels and initiating such a transition is described. The apparatus, referred to as a spectrum analyzer, contains a frequency channel noise detector that measures noise levels of multiple frequency channels in an upstream band including that of the frequency channel presently in use having a present noise level. The frequency channel noise detector measures the noise level of the frequency channel in use while the frequency channel transmits data upstream. The apparatus also contains a frequency channel noise level scanner that locates an "alternative" or preferred frequency channel from multiple frequency channels having a different noise level. The current frequency channel is used for transmitting data upstream if the present noise level is less than the noise level of the preferred frequency channel plus a predetermined noise value.

In one embodiment, the processor coupled or functioning with the spectrum analyzer performs as a data correlator for correlating power level data related to each of the multiple frequency channels. In another embodiment, the processor performs as a comparator for comparing the data error rate of the frequency channel in use against a predetermined threshold data error rate. In another embodiment, the processor associated with the spectrum analyzer performs as an an output device that instructs a downstream transmitter to direct cable modems to use a preferred frequency channel.

BRIEF DESCRIPTION OF THE DRAWINGS

The invention may be best understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

Important issues regarding the expansion of the existing cable system infrastructure to include full service two-way communication of digital data are reliability, low maintenance, and data integrity. The service must have low maintenance costs and must not alter data unintentionally during transmission. A high rate of data integrity is extremely important to most users. One way data is affected during transmission is by ingress noise, particularly on the upstream data path. Although it is desirable to transition to other upstream frequency channels having lower noise levels when an upstream frequency channel becomes too noisy, these transitions should only occur when the difference in noise levels is sufficiently significant to justify the processing and traffic overhead in making such a transition. One characteristic necessary for determining whether there is a significant difference in noise levels is the ability to measure the noise level of the frequency channel presently being used for upstream transmission.

Systems and methods for measuring noise in an upstream frequency channel while the channel is being used to transmit a signal is described in the various drawings. By measuring noise in the upstream frequency channel currently being used and comparing it to noise levels of other used and unused upstream frequency channels, the cable modem termination system (CMTS) can make a more informed and intelligent decision regarding whether to transition to another upstream frequency channel or remain on the one presently being used.

Figure 1:
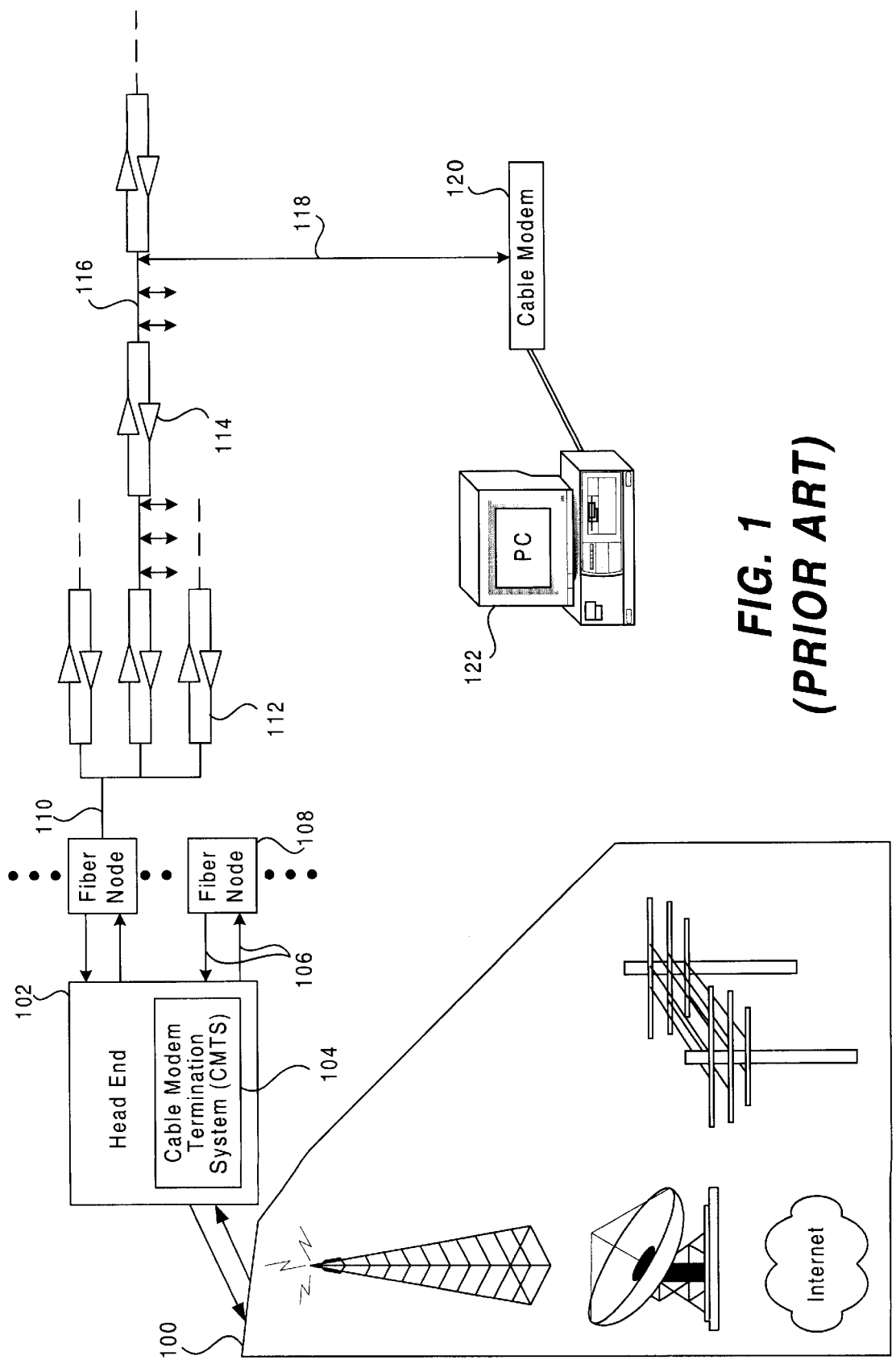
FIG. 1 is a block diagram of a two-way HFC cable system utilizing a cable modem for data transmission.
Figure 2A:
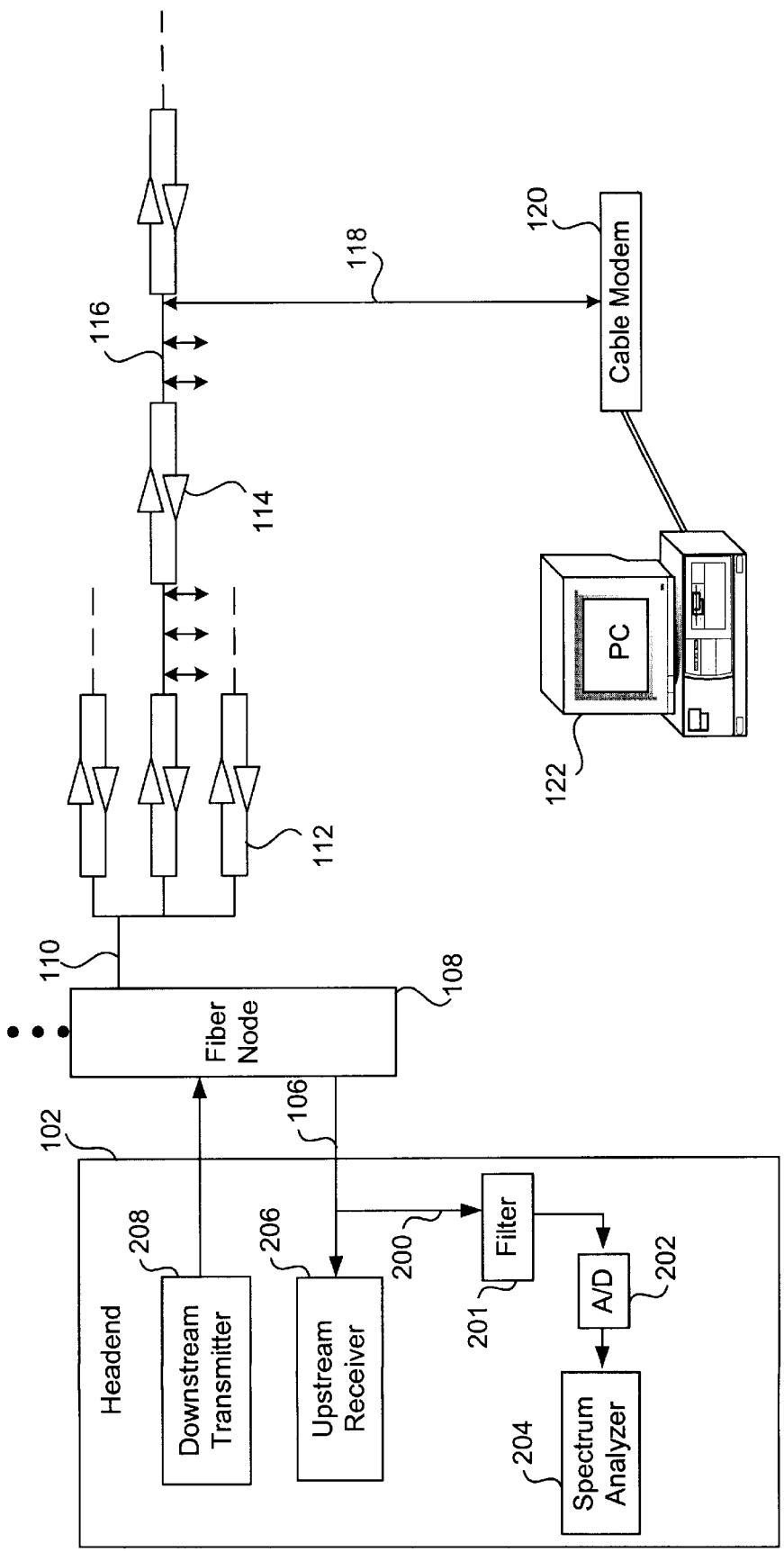
FIG. 2A is a block diagram of a cable plant showing one placement of a spectrum analyzer.

FIG. 2A is a block diagram of a cable plant showing a placement of a spectrum analyzer (also referred to as a spectrum manager) in accordance with one embodiment of the present invention. A data carrier 200 is shown tapping cable line 106 which leads directly to an upstream receiver 206. Receiver 206 demodulates the upstream RF signal (generally in the 5–42 MHz range in the United States and 5–65 MHz range for European specifications) using, for example, 16 QAM or QPSK modulation schemes as directed by the DOCSIS standard. The analog data is passed through an anti-alias filter 201, which essentially acts as a low-pass filter. Filter 201 cuts off or filters frequencies higher than 42 MHz or 65 MHz in Europe, or some other predetermined upper frequency limit. An analog/digital converter 202 digitizes the radio frequency signals and feeds the digitized upstream data to a spectrum analyzer 204 located within the CMTS (not shown) in a preferred embodiment. The digital upstream data is not diverted from reaching the upstream receiver (it is essential that receiver 206 always be fed the upstream data for two-way data transmission to function); rather, the data is received by both units. The energy of each data stream (one to the upstream receiver and one to the spectrum analyzer) is half of the total energy of the incoming upstream data. In another embodiment, a signal having more or less than half the total energy can be routed to the spectrum analyzer. In yet another embodiment, spectrum analyzer 204, as well as filter 201 and A/D converter 202, can be located on the upstream data path outside the headend. Regardless of where spectrum analyzer 204 is located, it accumulates data for further analysis by a central processing unit (not shown). Also shown in FIG. 2 is a downstream transmitter 208 that takes data in a packet structure and modulates it on the downstream carrier using, for example, QAM 64 modulation (other methods of modulation can be used such as Code Division Multiple Access, Orthogonal Frequency Division Multiplexing, or Frequency Shift Keying). In the described embodiment, the processes and techniques described below are performed by the spectrum analyzer, including a memory storage area, and a central processing unit utilized by the analyzer, as well as other components of the CMTS.

Figure 2B:
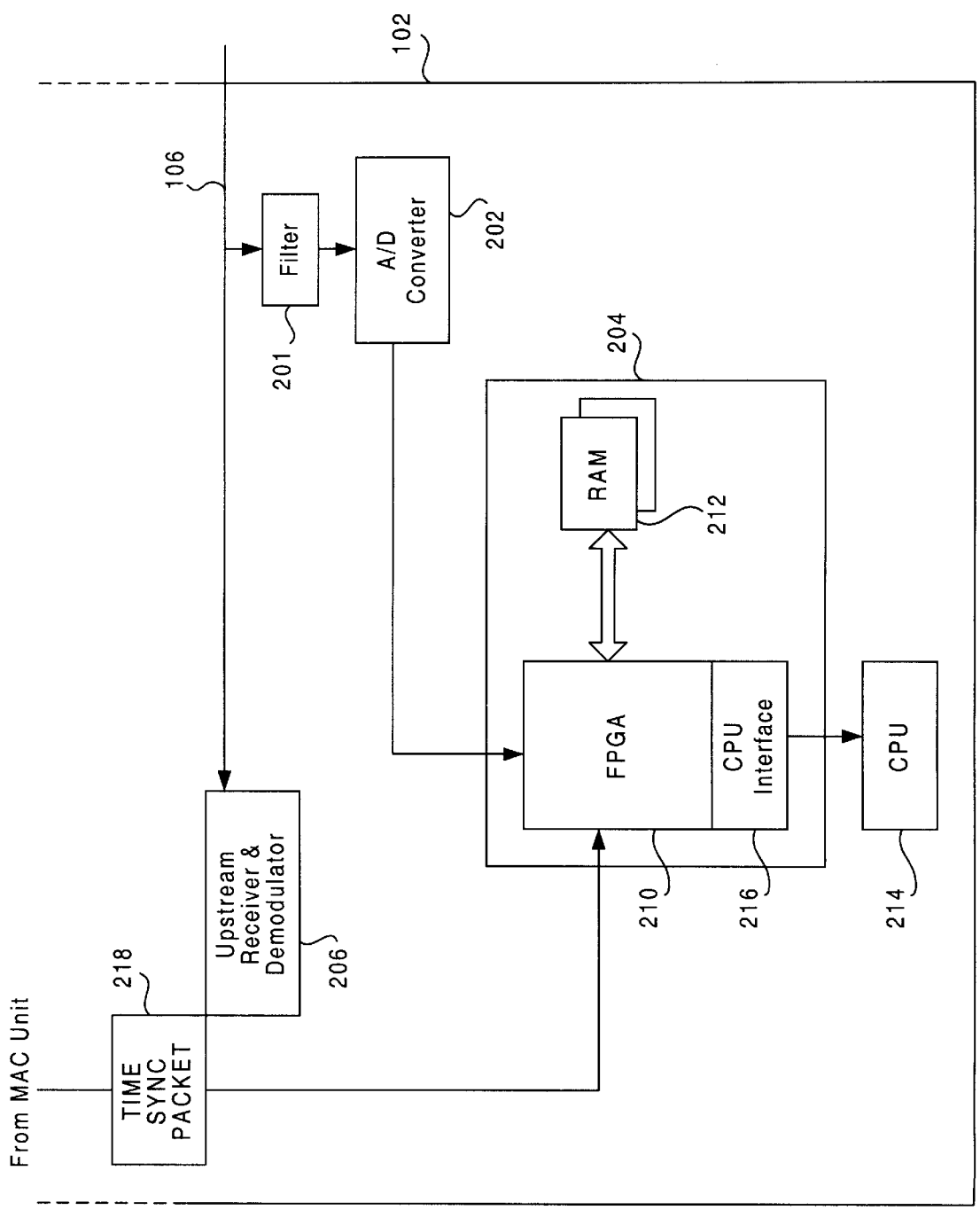
FIG. 2B is a block diagram of a spectrum analyzer and related components suitable for performing the functions of the present invention.

FIG. 2B shows in greater detail one location of spectrum analyzer 204 and its internal components in accordance with one embodiment of the present invention. Radio frequency signals 106 enter CMTS or headend 102 and are routed to spectrum analyzer 204 and to upstream receiver 206. Once digitized by A/D converter 202, the first component in spectrum analyzer 204 to receive the data is a field programmable gate array (FPGA) 210 where the data is processed. In the described embodiment, FPGA 210 is configured to perform all the mathematical operations required for a Fast Fourier Transform (FFT). In other embodiments, other components, such as a digital signal processor can be used to perform the FFT. Coupled to FPGA 210 is a memory storage area in the form of random access memory units 212 used to store data necessary for performing the mathematical functions of the FFT implemented within FPGA 210. RAM 212 is also used to temporarily store noise or power level data of the frequency channels. Noise level data is used in various ways, one of which is to derive a correlated noise level data for a particular frequency channel as described below. Once the data is processed by FPGA 210, the data can be accessed by a CPU 214 through a CPU interface 216, part of FPGA 210. CPU interface 216 is a hardware component that enables CPU 214 to read data calculated from the FFT implemented on FPGA 210. In the described embodiment, spectrum analyzer 204 knows when it will be receiving an empty data packet from a designated cable modem. This can be accomplished by having a Media Access Control (MAC) unit in CMTS 102 send a time synchronization data packet 218 to spectrum analyzer 204. A MAC unit is a common component found in CMTS 102 and is used to assign addresses of devices, such as cable modems and upstream receivers, to data packets before being transmitted either downstream or upstream in the cable plant and also manages timing of the transmission of data packets in the cable plant. Thus, it knows when the designated cable modem will be sending an empty data packet or no data at all upstream and informs a microcontroller (not shown) in FPGA 210 of this information. The MAC unit, as well as other components in the CMTS, and features of the cable plant in general are described in greater detail in pending U.S. patent application Ser. No. 08/962,231, titled Echo Device Method for Locating Upstream Ingress Noise Gaps at Cable Television Head Ends, filed Oct. 31, 1997 commonly assigned, and incorporated by reference herein for all purposes.

FPGA 210 and CPU 214 perform several of the functions of the present invention and described in the flow diagrams below. As mentioned above, FPGA 210 is configured to perform an FFT, a technique known in the art for measuring the power of a frequency channel. This technique is described in "Digital Techniques for Wide Band Receivers" by James Tsui (ISBN 0-89006-808-9), 1995, incorporated by reference herein. By performing an FFT and accumulating power level data from data packets on the upstream, including empty data packets (described in greater detail below), FPGA 210 functions as a frequency channel noise detector that measures power levels of multiple frequency channels in the upstream band including the power level of a frequency channel presently in use. FPGA 210 can also be configured to function as an upstream power measurement component by using an FFT to derive a power measurement of the entire upstream band (from 5 MHz to 42 MHz). By performing an FFT, FPGA 210 divides a frequency, whether a frequency channel or the entire upstream band, into multiple bandslices typically having norrow bandwidths such as 50 to 80 KHz.

CPU 214 has numerous functions in CMTS 102 With respect to the present invention, CPU 214 scans or examines the power level data calculated by the FFT. By functioning as a frequency channel noise level scanner, CPU 214 can identify a particular frequency channel having the lowest noise level or a noise level lower than the noise level of the frequency channel currently in use. CPU 214 can be programmed to take into account buffers or threshold values in determining whether the noise or power level of a particluar frequency channel meets predetermined conditions. For example, it can determine whether the noise level of a frequency channel is less than the noise level of the frequency channel of interest by a threshold amount, or whether a bit error rate (BER) provided by an upstream receiver for certain data packets is greater than a threshold BER value, described in greater detail below. Thus, more generally, CPU 214 can be used to process and manipulate noise and BER data relating to frequency channels in the upstream band. It should also be noted that, in the described embodiment, CPU 214 is a processor for CMTS 102 and can communicate instructions or data from one component to another component in CMTS 102 or to components external to CMTS 102. Thus, CPU 214 can be used to communicate instructions resulting from data derived from the FFT in the spectrum analyzer to downstream transmitter 208 or to a MAC unit, for example, instructing it to change a frequency channel for a group of cable modems. In other preferred embodiments, multiple CPUs can be utilized to perform the necessary processing functions of the CMTS.

Figure 3:
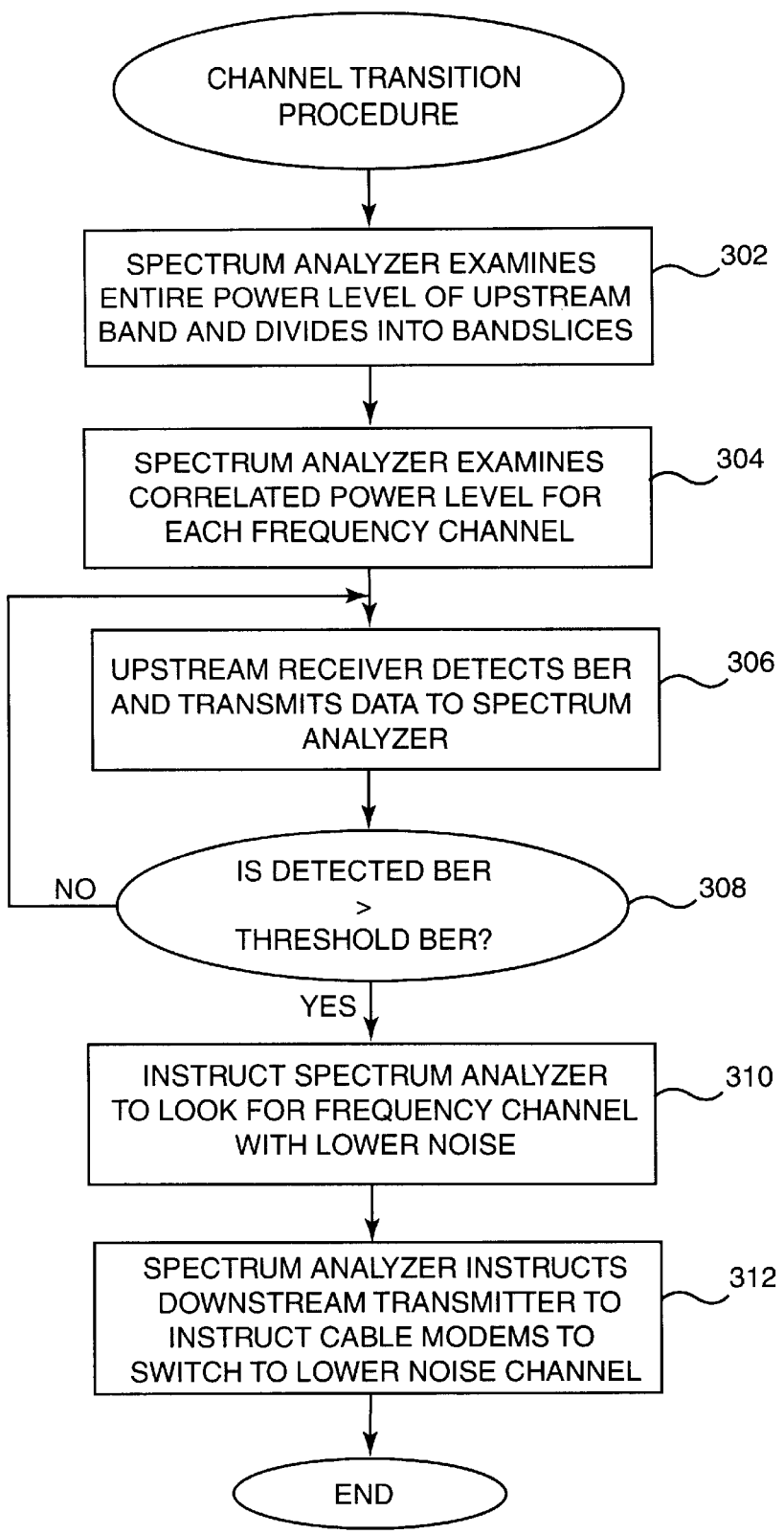
FIG. 3 is a flowchart describing a procedure for transitioning between different upstream frequency channels in accordance with one embodiment of the present invention.

FIG. 3 is a flowchart describing a procedure for transitioning between different upstream frequency channels in accordance with one embodiment of the present invention. In the described embodiment the procedure can be used to determine whether a particular upstream frequency channel being used by one or more cable modems to send data to a headend should still be used. At a step 302 the spectrum analyzer examines the entire power level of the upstream channel performing a Fast Fourier Transform (FFT) as is known in the art. Briefly, an FFT measures the power of a point in the frequency. This point is often referred to as a bin (the FFT "binarizes" the frequency channel). The bandwidth of a bin depends on various factors such as the size of the frequency (for example, as large as 5 MHz to 42 MHz or 65 MHz, or as small as an 800 KHz frequency channel) and the speed with which the system wants the data. That is, the bins created, the more processing that will be required by the FPGA. Thus, by measuring the power level, the spectrum analyzer divides the upstream channel into bins or multiple bandslices. Typically, a contiguous group of these bandslices make up a frequency channel (generally in the range of 300 KHz to 3.2 MHz). In the described embodiment, the spectrum analyzer performs a noise-level analysis, discussed below, of one upstream frequency channel at a time.

At a step 304 the spectrum analyzer examines the power level for each upstream frequency channel comprised of band slices created in step 302. The spectrum analyzer can calculate one of several types of correlated power level data related to each of the frequency channels, depending on the algorithm, including average, minimum, or maximum power levels of a particular frequency channel. To obtain the correlated power level data, the spectrum analyzer looks at the power level of a frequency channel at a particular instance of time. This sampling is done over a period of time or can be continuous. The correlated data is then stored by the spectrum analyzer in a separate memory area. The correlated data is used as a useful indication of the power on a particular channel.

At a step 306 the upstream receiver in the headend detects a bit error rate (BER) for a particular frequency channel examining headers in received data packets. The BER is then transmitted to a CPU where it is compared against a threshold BER. If the BER of the particular frequency channel is not greater than the threshold value, control returns to step 306. A threshold BER can be set according to a desired balance between a high signal (or carrier) to noise ratio or lower processing and traffic overhead in the cable plant. If the detected BER value is higher than the threshold BER, control goes to a step 310 in which the spectrum analyzer initiates a search for a cleaner or preferred frequency channel having a lower noise level. At a step 312 the headend, instructs the cable modems in the cable plant using the particular upstream frequency channel with the high BER to transition to the frequency channel with the lower noise level as determined at step 310 if certain conditions are met, as discussed below. The headend also assigns to each cable modem via an initial maintenance message a time interval in which the cable modem can send signals upstream to the headend.

Figure 4:
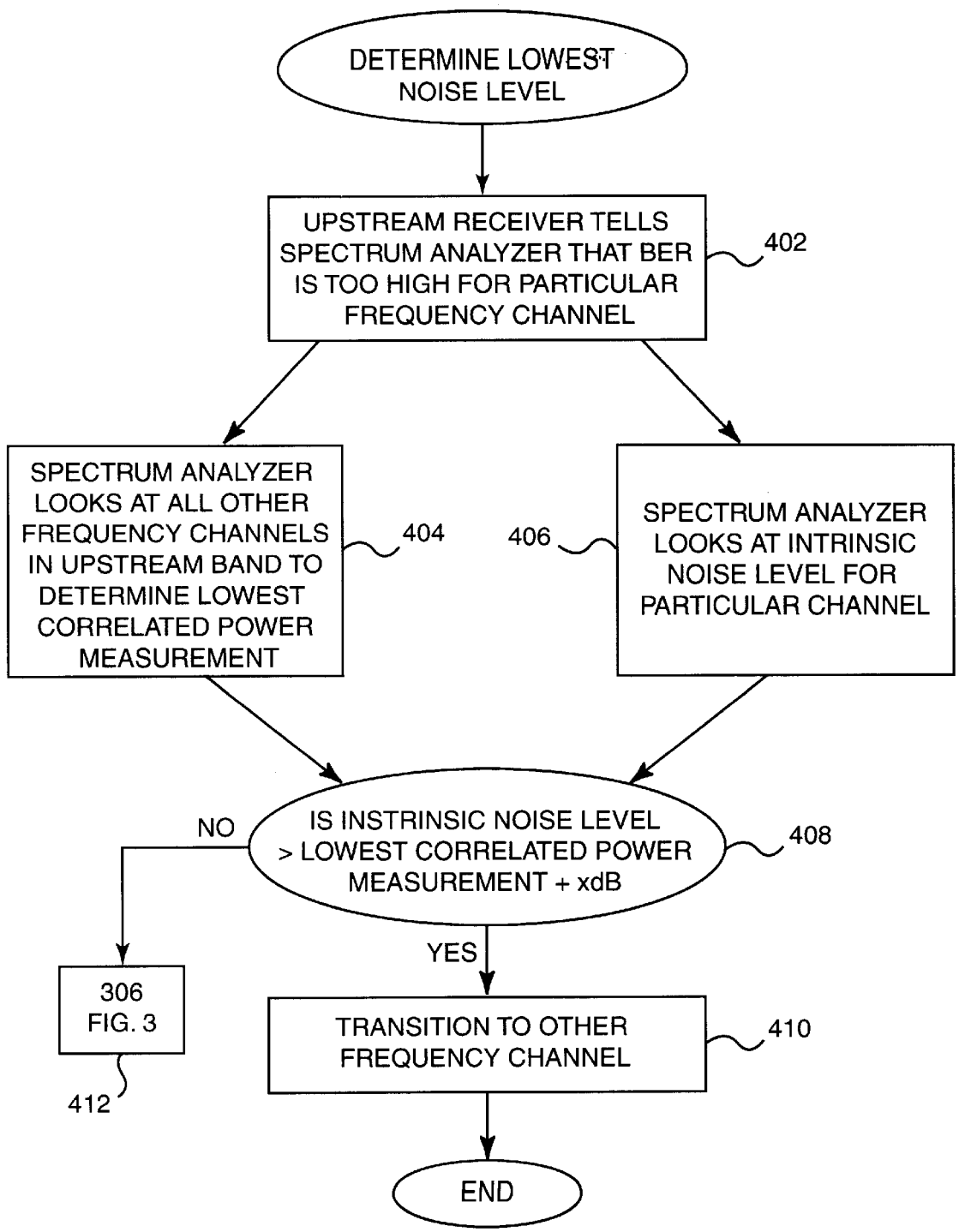
FIG. 4 is a flow diagram describing a process of determining the lowest noise level in an upstream channel in accordance with one embodiment of the present invention.

FIG. 4 is a flow diagram describing a process of identifying an upstream channel frequency having the lowest noise level in an upstream channel in accordance with one embodiment of the present invention. It shows in greater detail step 310 of FIG. 3. At a step 402 the upstream receiver informs the spectrum analyzer that the BER for a particular frequency channel has been surpassed. At a step 404 the spectrum analyzer looks at all other frequency channels in the upstream band to determine the lowest correlated power of the other cable modems in the cable plant. In the described embodiment, the correlated power measurement is an average power of other frequency channels in the cable plant. In other embodiments, the correlated power can be a minimum or maximum power measurement.

At a step 406 the spectrum analyzer determines the intrinsic noise level of the frequency channel presently being used. In the described embodiment this is done by accumulating data during timing marks or periods in which data packets that contain no data or signal are being transmitted. The data is accumulated at times when the spectrum analyzer is certain that the upstream receiver is not receiving any meaningful data. In another embodiment, the cable modem does not transmit a data packet at all during the modem's timing mark. At this time the CMTS has reserved a timing mark for a specific cable modem that sends no data. The spectrum analyzer can then measure the noise floor of the frequency channel without receiving a data packet. Through the process of the described embodiment, the spectrum analyzer can determine the noise floor for the frequency channel presently in use. In the described embodiment, steps 404 and 406 are done simultaneously.

At a step 408 the spectrum analyzer compares the intrinsic power level of the current frequency channel to the lowest correlated power of each of the other frequency channels plus a threshold noise factor or buffer XdB. The intrinsic power level of the current frequency channel is a measure of the noise level in that channel since the power level is being measured at a time when the spectrum analyzer is certain that no data or signal is being transmitted. Similarly, other frequency channels having a low power measurement are likely not transmitting a signal and are thus available as data carriers. In the described embodiment, the noise factor of XdB is used to ensure that if a transition to another frequency channel is made, it does not result in an insignificant or marginal improvement. As described above, the overhead in cable plant traffic and CMTS processing including sending out initial maintenance messages to all the cable modems, receiving, ranging, request messages from the modems, and allotting new timing marks, among other required processing, is significant when switching to another frequency channel. Thus, it is preferable that it only be done when the transition is worthwhile. Having a noise level factor or buffer of a certain x dB ensures that the transition will be worthwhile. In the described embodiment, x is in the range of 1 to 6 dB and is determined based on empirical data obtained at different cable plants. This data is related to the bit error rate ("BER") and signal to noise ratio.

If the intrinsic noise level is greater than the lowest power measurement plus the noise level buffer, the spectrum analyzer instructs a media access control unit in the CMTS to change the present frequency channel to the frequency channel having the lower power measurement at a step 410. If the intrinsic noise level is less than the lower power measurement plus the noise level buffer (even though it may have a BER greater than the threshold BER), the frequency channel does not change and control returns to step 306 of FIG. 3 where the upstream receiver and spectrum analyzer continue monitoring the BER for the presently used frequency channel as shown at a step 412.

Figure 5:
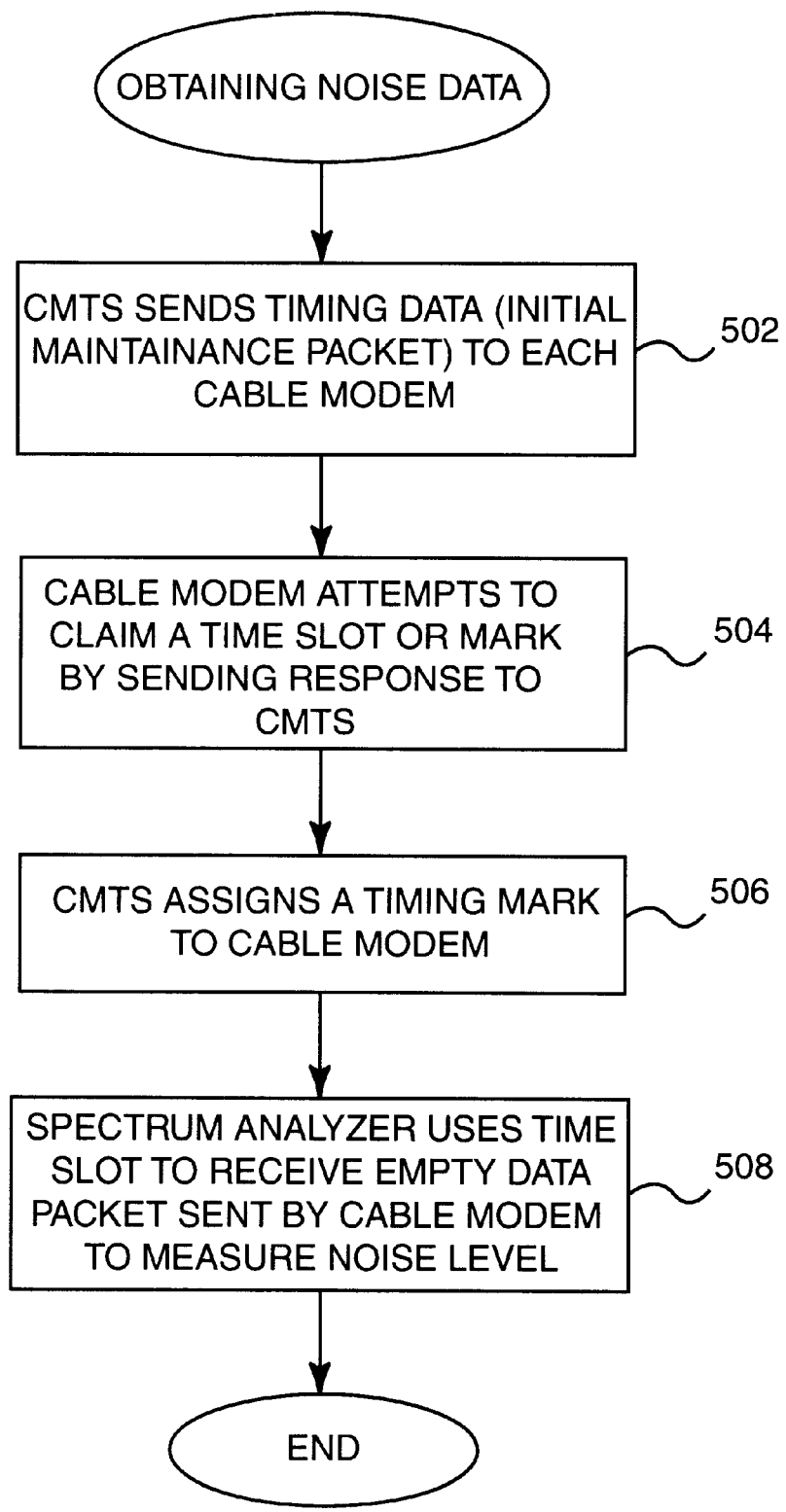
FIG. 5 is a flow diagram describing a process of allocating timing marks to cable modems thereby allowing the spectrum analyzer to use unused time slots to measure noise levels in accordance with one embodiment of the present invention.

FIG. 5 is a flow diagram describing a process of allocating timing marks to cable modems whereby the spectrum analyzer can use certain timing marks measure noise levels in accordance with one embodiment of the present invention. At a step 502, the CMTS sends an initial timing or synchronization data packet to all the cable modems (often referred to as an initial maintenance packet) on a particular frequency channel. The synchronization data packet essentially tells the cable modems when to send a message to the CMTS if any of the cable modems want to begin transmitting data. At a step 504 a particular cable modem requests that it be assigned a time slot for normal transmission of data upstream by sending a ranging request message to the CMTS indicating that it desires a time slot or timing mark. At a step 506 the CMTS assigns a timing mark to the cable modem thereby informing the cable modem that it can now transmit data upstream but only during the alloted time slot. This process of allotting time slots or timing marks to multiple devices using the same frequency channel is known in the art as time-division multiplexing.

At a step 508 the spectrum analyzer utilizes a timing mark that it knows (from the a MAC unit in the CMTS) is not being used to send actual data upstream from a particular cable modem to determine a floor noise level for the particular frequency channel while the frequency channel is being used. In the described embodiment, the spectrum analyzer can use an empty data packet sent by a particular cable modem. In this scenario, a particular timing mark can be assigned to a cable modem in which the cable modem sends an empty data packet. Thus, the spectrum analyzer (as well as the upstream receiver) will receive a data packet but will not have a signal measurement from the data packet, only noise. The spectrum analyzer can then measure the noise level of the frequency channel using a Fast Fourier Transform (FFT) as is known in the art. This value is then mapped or placed in a specially designated memory space so that it is separate from normal signal data used to determine BERs and correlated signal data for that particular frequency channel. By placing the noise level data in specially designated memory, it can be compared to data relating to noise levels of other frequency channels of the upstream channel. In the described embodiment, noise levels of other frequency channels are determined using an FFT to obtain the power level of the whole upstream channel and dividing the upstream channel into frequency channels (referred to earlier as sub-bands). It then examines the power levels of each frequency channel.

Although the foregoing invention has been described in some detail for purposes of clarity of understanding, it will be apparent that certain changes and modifications may be practiced within the scope of the appended claims. Furthermore, it should be noted that there are alternative ways of implementing both the process and system of the present invention. For example, instead of receiving an empty data packet at the spectrum receiver, the cable modem does not send any data and its allocated timing mark is not utilized. In another example, the spectrum analyzer can be placed outside the headend. In yet another example, the correlated power measurement can be a maximum or minimum power level. Accordingly, the present embodiments are to be considered as illustrative and not restrictive, and the invention is not to be limited to the details given herein, but may be modified within the scope and equivalents of the appended claims.

What is claimed is:

1. A method of transitioning from a first channel to a second channel in an cable network the cable network including a plurality of cable modems which communicate with a Head End via a plurality of channels, the plurality of channels including the first and second channel the method comprising:

measuring a first noise level associated with a first channel the first channel being used by a first cable modem for communicating with the Head End;

the first noise level being measured during a first non-idle timeslot of the first channel measuring a plurality of noise levels of a plurality of channels, wherein a second channel having a second noise level is identified, the second noise level being less n the first noise level by at least a predetermined amount; and causing the first cable modem to transition to the second channel for communicating with the Head End in response to detecting that the second noise level is less that the first noise level by at least a predetermined amount.

2. The method of claim 1 further comprising allocating use of the first non-idle timeslot to the first cable modem for transmitting information to the Head End.

3. The method of claim 1 wherein the non-idle timeslot corresponds to an active timeslot which has been allocated for use by the first cable modem.

4. The method of claim 1 wherein the non-idle timeslot corresponds to a timeslot allocated to the first cable modem to be used for measuring noise power on the first channel.

5. The method of claim 1 further comprising receiving a data packet from the first cable modem at the first non-idle timeslot.

6. The method of claim 1 further comprising not receiving a data packet from the first cable modem at the first non-idle timeslot.

7. The method of claim 1 further comprising dynamically determining the first noise level based upon at least one noise measurement reading on the first channel which was taken during non-idle timeslots allocated to the first cable modem.

8. A method as recited in claim 1 further comprising detecting an error rate for the first channel wherein the error rate is detected by an upstream receiver and communicated to a spectrum analyzer.

9. A method as recited in claim 8 further comprising:

determining whether the error rate exceeds a predetermined threshold; and measuring the plurality of noise levels of the plurality of channels based on whether the error rate for the first channel exceeds the predetermined threshold.

10. A method as recited in claim 8 further comprising accumulating noise-level data relating to the first channel at predetermined time intervals, said predetermined time intervals being related to non-idle timeslots.

11. A method as recited in claim 10 wherein the predetermined time intervals are non-idle time slots in which the spectrum analyzer receives an empty data packet.

12. A method as recited in claim 10 wherein the predetermined time intervals are non-idle time slots in which the spectrum analyzer does not expect to receive a data packet.

13. A method as recited in claim 1 further comprising measuring an entire power level of an upstream band.

14. A method as recited in claim 1 further comprising determining whether the first noise level is greater than each noise level associated with a plurality of noise levels associated with a plurality of channels by at least the predetermined amount.

15. A method as recited in claim 14 wherein the predetermined amount is chosen such that a transition to another channel will result in improved upstream data transmission.

16. A method as recited in claim 1 further comprising causing the first cable modem to transition to another channel if the first noise level is greater than any of the noise levels of the plurality of noise levels.

17. A method as recited in claim 1 further comprising using non-idle time slots to accumulate noise-level data for the first channel.

18. A method as recited in claim 1 further comprising using at least one empty data packet to accumulate noise level data for the first channel.

19. A computer program product including a computer usable medium having computer readable code embodied therein computer readable code comprising computer code for implementing the method of claim 1.

20. A method of m noise on at least one channel of a cable network, the cable network including a plurality of cable modems which communicate with a Head End via a plurality of channels, the method comprising:

selecting a first channel;

allocating use of a first timeslot on the first channel to a first cable modem for transmitting information to the Head End;

said first timeslot thereby corresponding to a non-idle timeslot; and measuring, at the first timeslot, a first noise level associated with the first channel.

21. The method of claim 20 further comprising allocating exclusive use of the first timeslot to the first cable modem.

22. The method of claim 20 wherein the non-idle timeslot corresponds to an active timeslot which has been allocated for use by the first cable modem.

23. The method of claim 20 wherein the non-idle timeslot corresponds to a timeslot allocated to the first cable modem to be used for measuring noise power on the first channel.

24. The method of claim 20 further comprising receiving a data packet from the first cable modem at the first timeslot.

25. The method of claim 20 further comprising not receiving a data packet from the first cable modem at the first timeslot.

26. The method of claim 20 further comprising dynamically determining the first noise level based upon at least one noise measurement reading on the first channel which was taken during non-idle timeslots allocated to the first cable modem.

27. A method as recited in claim 20 further comprising measuring a power level of an upstream band whereby a Fast Fourier Transform is Performed dividing the upstream band into a plurality of bandslices.

28. A method as recited in claim 27 wherein the upstream channel is created from one or more bandslices.

29. A method as recited in claim 20 wherein selecting an upstream channel further comprises detecting a plurality of data error rates of a plurality of upstream channels and comparing the plurality of data error rates to a threshold data error rate.

30. A method as recited in claim 20 wherein the first channel is configured as a time division multiplexed channel.

31. A method as recited in claim 20 wherein measuring the noise level of the first channel further comprises:
  measuring the power level of the first channel at a time value corresponding to the first timeslot, and
  storing data relating to the power level of the first channel for subsequent processing.

32. A computer program product including a computer usable medium having computer readable code embodied therein, the computer readable code comprising computer code for implementing the method of claim 20.

33. A spectrum analyzer for use in a cable network, the cable network including a plurality of cable modems which communicate with a Head End via a plurality of channels, the spectrum analyzer comprising:
  a channel noise detector configured or designed to measure noise level of a plurality of channels in an upstream band including a first channel having a first noise level associated therewith;
  the channel noise detector being further configured or designed to measure the first noise level on the first upstream channel during at least one non-idle timeslot on the first upstream channel.

34. The spectrum analyzer of claim 33 wherein the at least one non-idle timeslot includes a first non-idle timeslot corresponding to an active timeslot which has been allocated for use by a first cable modem.

35. The spectrum analyzer of claim 33 wherein the at least one non-idle timeslot includes a first non-idle timeslot corresponding to a timeslot allocated to a first cable modem to be used for measuring noise power on the first channel.

36. The spectrum analyzer of claim 33 further comprising a channel noise level scanner configured or designed to locate a second channel from the plurality of channels in the upstream band, the second channel having a second noise level associated therewith.

37. The spectrum analyzer of claim 33 wherein the channel noise level scanner is further configured or designed to locate a channel from the upstream band having a relatively lowest associated noise level.

38. A spectrum analyzer as recited in claim 33 further comprising an upstream power measurement component for measuring the power of the upstream band.

39. A spectrum analyzer as recited in claim 38 wherein the upstream power measurement component performs a Fast Fourier Transform thereby dividing the upstream band into multiple bandslices.

40. A spectrum analyzer as recited in claim 33 wherein the channel noise detector further comprises a data correlator for correlating power level data related to each channel of the plurality of channels.

41. A spectrum analyzer as recited in claim 33 further comprising a comparator for comparing a first data error rate of the first channel against a predetermined threshold data error rate.

42. A spectrum analyzer as recited in claim 33 further comprising a memory storage area designated for storing noise level data.

43. A spectrum analyzer as recited in claim 33 further comprising a means for processing error rate data of the fist channel of the plurality of channels.

44. A spectrum analyzer as recited in claim 33 wherein the channel noise level scanner further comprises an output device for instructing a downstream transmitter to direct a plurality of cable modems to use the second channel.

45. A system of measuring noise on at least one channel of a cable network, the cable network including a plurality of cable modems which communicate with a Head End via a plurality of channels, the system comprising:
  means for selecting a first channel;
  means for allocating use of a first timeslot on the first channel to a first cable modem for transmitting information to the Head End;
  said first timeslot thereby corresponding to a non-idle timeslot; and
  means for measuring, at the first timeslot, a first noise level associated with the first channel.

46. The system of claim 45 further comprising:
  means for measuring a plurality of noise levels of a plurality of channels, wherein a second channel having a second noise level is identified, the second noise level being less than the first noise level by at least a predetermined amount; and
  means for causing the first cable modem to transition to the second channel for communicating with the Read End in response to detecting that the second noise level is less than the first noise level by at least a predetermined amount.

47. The method of claim 45 wherein the non-idle timeslot corresponds to an active timeslot which has been allocated for use by the first cable modem.

48. The method of claim 45 wherein the non-idle timeslot corresponds to a timeslot allocated to the first cable modem to be used for measuring noise power on the first channel.

49. The system of claim 45 further comprising means for allocating exclusive use of the first timeslot to the first cable modem.

50. The system of claim 45 further comprising means for dynamically determining the first noise level based upon at least one noise measurement reading on the first channel which was taken during non-idle timeslots allocated to the first cable modem.

51. A system as recited in claim 45 further comprising means for measuring a power level of an upstream band whereby a Fast Fourier Transform is performed dividing the upstream band into a plurality of bandslices.

52. A as recited in claim 51 wherein the upstream channel is created from one or more bandslices.

53. A system as recited in claim 45 wherein the means for selecting an upstream channel further comprises means for detecting a plurality of data error rates of a plurality of upstream channels and comparing the plurality of data error rates to a threshold data error rate.

54. A system as recited in claim 45 wherein the first channel is configured as a time division multiplexed channel.

55. A system as recited in claim 45 wherein means for measuring the noise level of the first channel further comprises;
  means for measuring the power level of the first channel at a time value corresponding to the first timeslot, and
  means for storing data rating to the power level of the first channel for subsequent processing.

56. A system of measure noise on at least one channel of a cable network, the cable network including a plurality of cable modems which communicate with a Head End via a plurality of channels, the system comprising:
  at least one processor;
  at least one interface configured or designed to provide a communication link to at least one other network device in the data network; and
  memory;
  the system being configured or designed to select a fist channel;

the system being further configured or designed to allocate use of a first timeslot on the first channel to a first cable modem for transmit information to the Head End;

said first timeslot thereby corresponding to a non-idle timeslot; and the system being further configured or designed to measure, at the first timeslot, a first noise level associated with the first channel.

57. The system of claim 56 being further configured or designed to allocate exclusive use of the first timeslot to the fist cable modem.

58. The system of claim 56 wherein the non-idle timeslot corresponds to an active timeslot which has been allocated for use by the first cable modem.

59. The system of claim 56 wherein the non-idle timeslot corresponds to a timeslot allocated to the fist cable modem to be used for measure noise power on the first channel.

60. The system of claim 56 being further configured or designed to receive a data packet from the first cable modem at the first timeslot.

61. The system of claim 56 being further configured or designed to not receive a data packet from the fist cable modem at the first timeslot.

62. The system of claim 56 being further configured or designed to dynamically determine the first noise level based upon at least one noise measurement reading on the first channel which was taken during non-idle timeslots allocated to the first cable modem.

63. A system as recited in claim 56 being further configured or designed to measure a power level of an upstream band whereby a Fast Fourier transform is performed dividing the upstream band into a plurality of bandslices.

64. A system as recited in claim 63 wherein the upstream channel is created from one or more bandslices.

65. A system as recited in claim 56 being further configured or designed to detect a plurality of data error rates of a plurality of upstream channels and compare the plurality of data error rates to a threshold data error rate.

66. A system as recited in claim 56 being further configured or designed to:

measure the power level of the first channel at a time value corresponding to the first timeslot, and store data relating to the power level of the first channel for subsequent processing.

* * * * *